N. S. COOPER.
MOWING MACHINE.
APPLICATION FILED APR. 30, 1918. RENEWED NOV. 10, 1919.

1,333,540.

Patented Mar. 9, 1920.
2 SHEETS—SHEET 1.

WITNESSES.

Inventor
N. S. Cooper,
By Victor J. Evans
Attorney

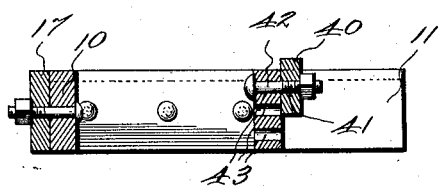
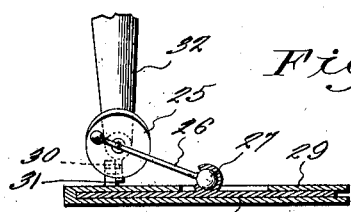
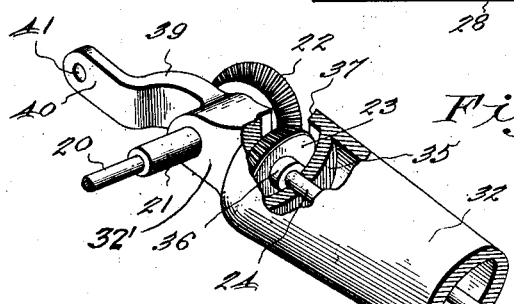
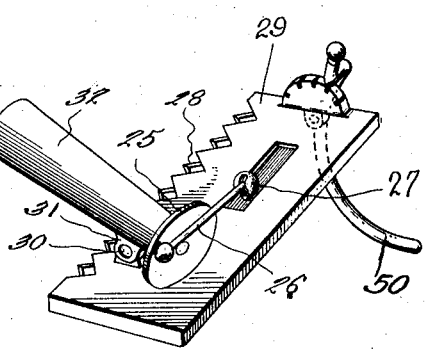

UNITED STATES PATENT OFFICE.

NATHAN S. COOPER, OF PHIL CAMPBELL, ALABAMA.

MOWING-MACHINE.

1,333,540.  Specification of Letters Patent.  Patented Mar. 9, 1920.

Application filed April 30, 1918, Serial No. 231,780. Renewed November 10, 1919. Serial No. 337,055.

*To all whom it may concern:*

Be it known that I, NATHAN S. COOPER, a citizen of the United States, residing at Phil Campbell, in the county of Franklin and State of Alabama, have invented new and useful Improvements in Mowing-Machines, of which the following is a specification.

This invention relates to farming implements.

The improvement is in the nature of a mower, and has for its object to simplify and improve the existing art by producing a mowing machine in which the cutter is operated with ease and with great rapidity by a simple construction and arrangement of parts as deriving power from the ground or bull wheel.

A further object of the invention is to produce a mowing machine designed to be propelled by a single draft animal, in which the parts are so constructed and arranged as to insure the reciprocation of the cutter blade in a positive manner and with the least amount of exertion by the hand controlling the machine and by the draft animal.

It is a still further object of the invention to produce a mowing machine designed to cut vegetation between rows of corn or the stalks of corn in a row without interfering with the stalks in the adjacent row.

It is a still further object of the invention to provide a mowing machine with a trailing hollow arm or casing to which the cutter is attached, the drive shaft for the cutter being arranged in the hollow casing and deriving power operated by means upon the opposite side of the frame of the machine, said means being actuated by the bull or drive wheel of the device.

Other objects and advantages will appear as the nature of the invention is better understood, reference being had to the accompanying drawings, in which, Figure 1 is a side elevation of a mowing machine constructed in accordance with the present invention.

Fig. 4 is a sectional view approximately on the line 4—4 of Fig. 3.

Fig. 5 is a detail enlarged sectional view approximately on the line 5—5 of Fig. 3.

Fig. 6 is a perspective view of the drive shaft casing illustrating its connection with the cutter bar, parts being broken away and parts being in section.

Figure 1:
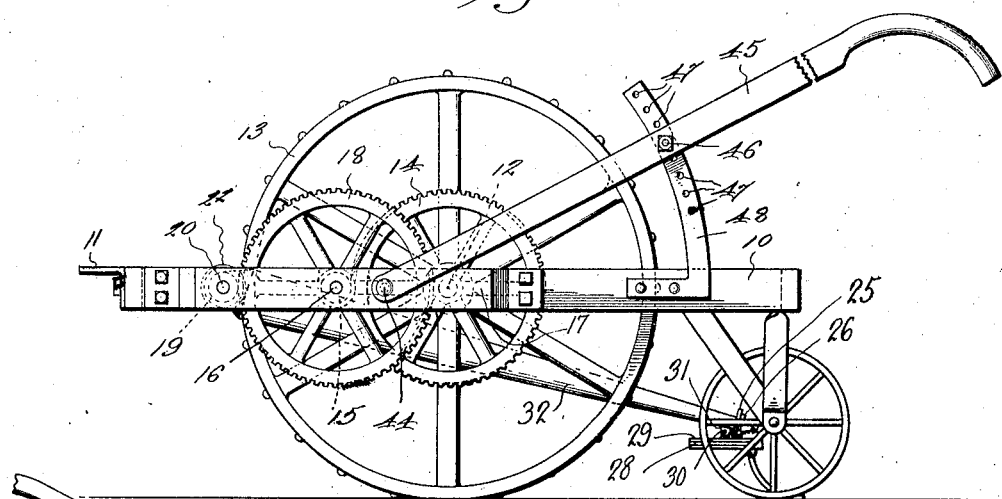
Figure 2:
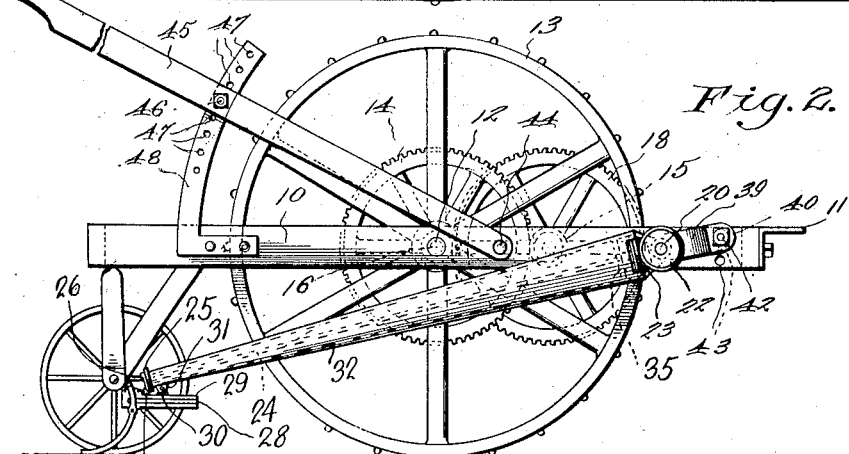
Fig. 2 is a similar view looking toward the opposite side of the machine.
Figure 3:
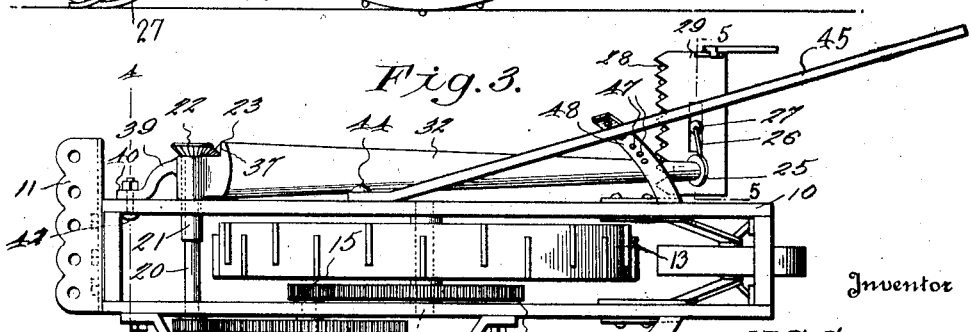
Fig. 3 is a top plan view.

As disclosed by the drawings the improvement contemplates the employment of a substantially rectangular frame 10, having at the forward end thereof a horizontally disposed clevis 11 which extends beyond one of the sides of the frame and which, of course, is provided with spaced openings any one of which receiving a hook or ring attached to the swingletree of the draft animal. Journaled in suitable bearing openings in the sides of the frame 10 is a shaft 12 on which is keyed the drive or bull wheel 13. Also keyed on the shaft 12, to one side of the wheel 13 is a gear wheel 14 meshing with the pinion 15 secured upon a shaft 16 journaled in a bearing opening in one of the sides of the frame 10 as well as in a similar opening in a bracket 17 secured longitudinally to the side of the bracket. On the shaft 16, inward of the bracket 17 is secured a toothed wheel 18 that meshes with a pinion 19, the said pinion being keyed upon a shaft 20 and this shaft is journaled in bearing openings in the bracket 17 and one of the sides of the frame 10. The opposite side of the frame 10 has secured in an opening therein a sleeve 21 through which the shaft 20 extends, the said sleeve providing a bearing for the shaft. The outer end of the shaft 20, on the end thereof extending through the sleeve 21 has secured thereto a beveled toothed wheel 22, and this wheel 22 meshes with a similar beveled toothed wheel 23 secured upon the outer end of a shaft 24, the said shaft having arranged upon its opposite end a flat wheel 25. Eccentrically pivoted to the outer face of the wheel 25 is a link or pitman 26 that is loosely connected, preferably through the means of a ball and socket joint 27 thereof to the reciprocatory knife 28 that is slidably arranged on the cutter bar 29.

The cutter bar is loosely supported by a pivotal connection 30 with an ear 31 formed upon the lower and reduced end of a substantially cone-shaped casing 32. This casing may, if desired, be constructed of two sections and is provided, upon its inner surface or bore with one or more spaced partitions each having an opening providing a bearing for the shaft 34. The upper partition is indicated by the numeral 35. Resting on this partition is a sleeve or boss 36 formed on the inner straight face of the beveled toothed wheel 23. The casing 32 has one of its sides provided with an opening 37, the same being arranged outward of the partition 35, and in this opening the toothed surface of the beveled wheel 22 is designed to play and to engage with the teeth of the beveled wheel 23. The closed end of the casing is provided with a boss 32' having a transverse opening therethrough that provides a bearing for the sleeve 21.

Integrally formed with the boss 32' is an arm 39 rounded inwardly toward the frame 10 from its connection with the casing 32 and from thence provided with a straight extension 40. This extension has a transverse opening 41 therethrough and through its opening is designed to pass a removable member, preferably in the nature of a pin 42, the said pin being also designed to be received in any one or a number of spaced openings 43 provided upon the side of the frame 10, the open or curved arm secured to the said side of the frame. By this arrangement it will be noted that the cutter bar may be arranged at any desired elevation with respect to the ground surface over which it operates. It will be further noted that by entirely removing the pin 42 the cutter bar will be in the nature of a drag, at all times contacting with the ground surface so as to cut low or close thereto. The cutter is comparatively short, as the device is primarily designed, as previously stated for employment between rows of corn or other vegetation planted by drills.

If desired the frame may have journaled at the rear thereof a guide or colter wheel, and to the sides of the frame are pivotally secured, as at 44, the handle members 45. These handles are retained at a proper distance with respect to the frame through the medium of removable pin members 46 passing through a suitable opening therein and being received in one of a plurality of spaced openings 47 provided upon the arched bar or rack 48, said racks being secured to the rear of the frame 10.

From the foregoing description it will be seen that I have produced a device of simple construction which will be efficient in operation and one which is admirably adapted for the attainment of the ends in view, and it is believed that the simplicity and advantages thereof will be apparent to those skilled in the art to which such invention appertains without further detailed description, it being thought merely necessary to add that the cutter bar may be provided with the usual guider or gage rod 50, as disclosed by the drawings, and with the arrangement of parts as set forth the frame is properly balanced and the cutter bar is maintained, at all times in proper cutting position.

What I claim is:

In a mowing machine, the combination with a frame having a ground wheel journaled thereon and a shaft journaled in bearings forward of the ground wheel and means actuated by the ground wheel for imparting motion to the shaft, of a sleeve on the frame providing a bearing for the shaft, a beveled toothed wheel on the end of the shaft outward of the sleeve, a conical casing having its wider end closed and provided with an opening receiving the sleeve whereby to pivotally connect the casing to the sleeve, a shaft journaled in bearings in the casing and having one of its ends extending therethrough, a cutter, said cutter operated by said shaft, a beveled toothed wheel on the shaft projecting through an opening in the casing and meshing with the toothed wheel of the first mentioned shaft, an angular arm on the closed end of the casing, means for adjustably connecting said arm to the frame to regulate the angular arrangement of the casing with respect to the frame and means for regulating the position of the cutter with respect to the ground.

In testimony whereof I affix my signature.

NATHAN COOPER.